(12) United States Patent
Kumar et al.

(10) Patent No.: US 10,122,582 B2
(45) Date of Patent: Nov. 6, 2018

(54) SYSTEM AND METHOD FOR EFFICIENT BANDWIDTH ALLOCATION FOR FORKED COMMUNICATION SESSIONS

(71) Applicant: Avaya Inc., Santa Clara, CA (US)

(72) Inventors: Puneet Kumar, Pune (IN); Tibor Lukac, Superior, CO (US)

(73) Assignee: Avaya Inc., Santa Clara, CA (US)

( * ) Notice: Subject to any disclaimer, the term of this patent is extended or adjusted under 35 U.S.C. 154(b) by 183 days.

(21) Appl. No.: 15/163,472

(22) Filed: May 24, 2016

(65) Prior Publication Data

US 2017/0346697 A1 Nov. 30, 2017

(51) Int. Cl.
*H04L 12/24* (2006.01)
*H04L 29/08* (2006.01)
*H04L 29/06* (2006.01)

(52) U.S. Cl.
CPC ...... *H04L 41/0896* (2013.01); *H04L 65/1006* (2013.01); *H04L 67/142* (2013.01)

(58) Field of Classification Search
CPC ................................................ H04L 41/0896
See application file for complete search history.

(56) References Cited

U.S. PATENT DOCUMENTS

| | | | | |
|---|---|---|---|---|
| 6,259,701 B1 * | 7/2001 | Shur | ..................... | H04L 12/185 370/252 |
| 6,678,264 B1 * | 1/2004 | Gibson | ................... | H04L 45/00 370/352 |
| 6,680,943 B1 * | 1/2004 | Gibson | ................... | H04L 29/06 370/392 |
| 7,031,326 B1 * | 4/2006 | Shur | ................... | H04L 12/1831 370/351 |
| 8,767,617 B2 * | 7/2014 | Wisely | .................... | H04L 12/66 370/328 |
| 9,066,158 B2 * | 6/2015 | Liu | ..................... | H04N 21/2383 |
| 9,716,916 B2 * | 7/2017 | Major | .............. | H04N 21/64738 |
| 9,769,225 B2 * | 9/2017 | Kalburgi | ............. | H04L 65/4061 |
| 2004/0215787 A1 * | 10/2004 | Gibson | ................... | H04L 45/00 709/227 |

(Continued)

OTHER PUBLICATIONS

Radunović, Bozidar, and Jean-Yves Le Boudec. "A unified framework for max-min and min-max fairness with applications." IEEE/ACM Transactions on Networking (TON)15.5 (2007): 1073-1083.*

(Continued)

*Primary Examiner* — Jimmy H Tran
(74) *Attorney, Agent, or Firm* — Sheridan Ross P.C.

(57) ABSTRACT

A request for a communication session is received by a system. For example, a request to establish a voice communication session is received by the system. The system determines whether the request for the communication session is to be forked to a plurality of communication endpoints. If the communication session is to be forked, a highest bandwidth requirement for the forked communication session is determined. The determined highest bandwidth requirement for the forked communication session is based on a highest bandwidth requirement of one or more codecs that are defined in the received request for the communication session. The determined highest bandwidth requirement for the forked communication session is allocated so that the forked communication session can be established.

20 Claims, 5 Drawing Sheets

FIG. 1

(56) References Cited

U.S. PATENT DOCUMENTS

| | | | |
|---|---|---|---|
| 2005/0228892 A1* | 10/2005 | Riley | H04L 47/724 709/228 |
| 2006/0039388 A1* | 2/2006 | Shur | H04L 12/185 370/401 |
| 2009/0010277 A1* | 1/2009 | Halbraich | H04L 67/125 370/465 |
| 2009/0204713 A1* | 8/2009 | Beziot | H04L 65/1016 709/228 |
| 2010/0154029 A1* | 6/2010 | Fernandez Alonso | H04L 29/06027 726/1 |
| 2011/0072075 A1* | 3/2011 | Gautier | H04L 12/1881 709/203 |
| 2011/0208853 A1* | 8/2011 | Castro-Castro | H04L 12/14 709/223 |
| 2011/0292839 A1* | 12/2011 | Swaminathan | H04L 65/1069 370/259 |
| 2013/0246632 A1* | 9/2013 | Ginde | H04L 65/1006 709/227 |
| 2013/0322429 A1* | 12/2013 | Mann | H04L 65/1003 370/352 |
| 2014/0067941 A1* | 3/2014 | Mann | H04L 41/0893 709/204 |
| 2014/0068100 A1* | 3/2014 | Mann | H04L 45/306 709/238 |
| 2014/0068101 A1* | 3/2014 | Mann | H04L 67/28 709/238 |
| 2014/0068102 A1* | 3/2014 | Mann | H04L 67/28 709/238 |
| 2014/0112133 A1* | 4/2014 | Xia | H04L 12/1407 370/230 |
| 2014/0189754 A1* | 7/2014 | Major | H04L 65/4076 725/67 |
| 2014/0317183 A1* | 10/2014 | Shah | H04L 65/403 709/204 |
| 2015/0098363 A1* | 4/2015 | Pearce | H04M 3/42221 370/259 |
| 2017/0149846 A1* | 5/2017 | Mufti | H04M 3/465 |
| 2017/0214534 A1* | 7/2017 | Rivas Molina | H04L 12/1407 |
| 2017/0331691 A1* | 11/2017 | Zhou | H04L 41/0893 |

OTHER PUBLICATIONS

RFC 4566 https://tools.ietf.org/html/rfc4566.*
RFC 4412 https://tools.ietf.org/html/rfc4412.*

* cited by examiner

SYSTEM AND METHOD FOR EFFICIENT BANDWIDTH ALLOCATION FOR FORKED COMMUNICATION SESSIONS

BACKGROUND

Over the past decade, the number of communication endpoints associated with a user has changed dramatically. Previously, a user would only have communication endpoints that are only associated with a single number. For example, the user would have a home phone and/or a work phone, each with a different number. Today, the user may have multiple communication endpoints associated with a single address of record (e.g., a phone number). When a request for a communication session is initiated to the address of record, the communication session may be forked to each of the communication endpoints associated with the address of record.

Forking a communication session may cause bandwidth allocation issues. For example, if there is currently 100 kilobits per second (Kbps) of available bandwidth on a network and a voice call that takes 50 kilobits is forked to three communication endpoints, the system will try to allocate 150 Kbps of bandwidth, which is more than is available. This can result in the communication session being dropped or in one or more of the forked calls to be dropped.

SUMMARY

These and other needs are addressed by the various embodiments and configurations of the present disclosure. A request for a communication session is received. For example, a request to establish a voice communication session is received. The system determines whether the request for the communication session is to be forked to a plurality of communication endpoints. If the communication session is to be forked, a highest bandwidth requirement for the forked communication session is determined. The highest bandwidth requirement for the forked communication session is based on a highest bandwidth requirement of one or more codecs in the request for the communication session. The highest bandwidth requirement for the forked communication session is allocated so that the forked communication session can be established. For the forked legs of the communication session, multiple bandwidth allocations are not necessary because only one of fork of the communication will be answered.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented

DETAILED DESCRIPTION

Figure 1:
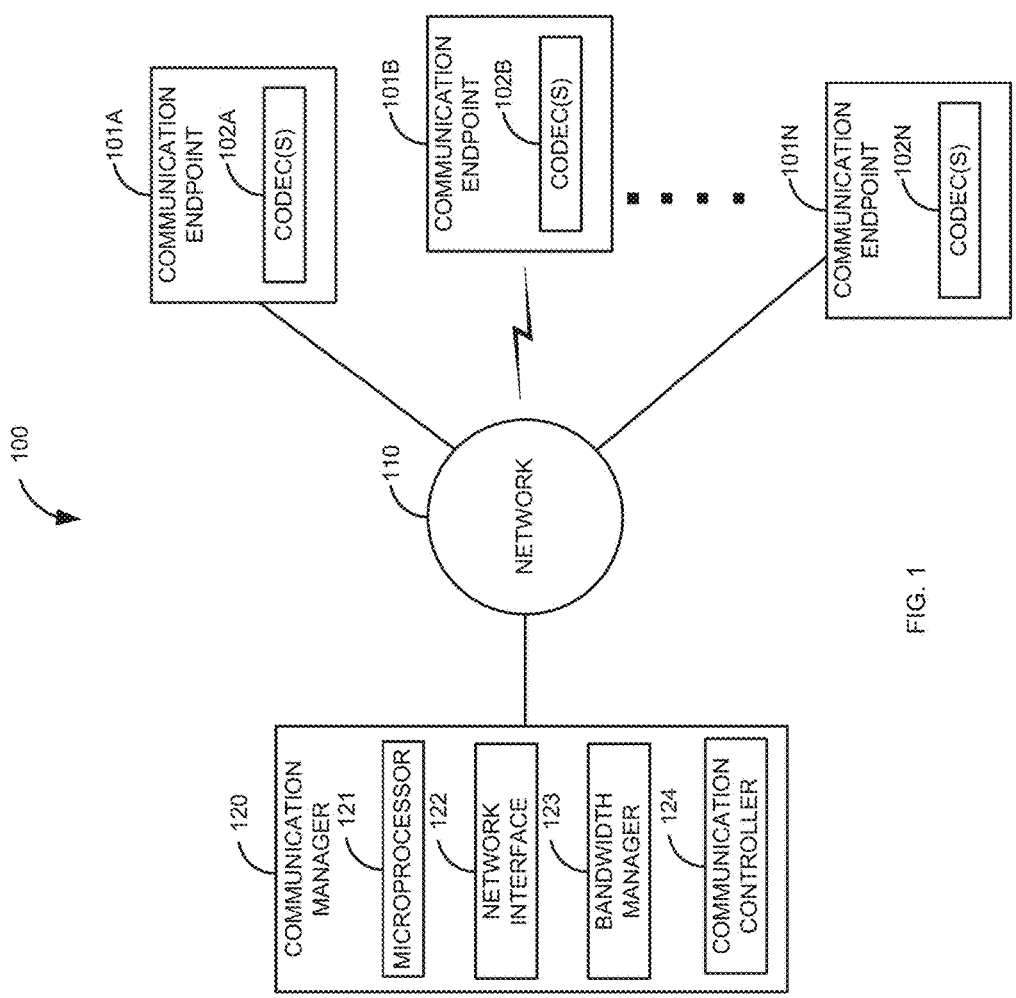
FIG. 1 is a block diagram of a first illustrative system for efficient allocation of bandwidth for forked communication sessions.

FIG. 1 is a block diagram of a first illustrative system 100 for efficient allocation of bandwidth for forked communication sessions. The first illustrative system 100 comprises communication endpoints 101A-101N, a network 110, and a communication manager 120.

The communication endpoints 101A-101N can be or may include any device that can communicate on the networks 110, such as a Personal Computer (PC), a telephone, a video system (e.g., a video conferencing system), a cellular telephone, a Personal Digital Assistant (PDA), a tablet device, a notebook device, a smart phone, and/or the like. The communication endpoints 101A-101N may communicate using various modalities, such as voice, video, multimedia, Instant Messaging (IM), text, text messaging, email, and/or the like.

The communication endpoints 101A-101N also comprises one or more codecs 102A-102N. The one or more codecs 102A-102N can be any kind of known codec 102 that can encode and/or decode information, such as voice, video, data, media streams, multimedia, social media, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Session Description Protocol (SDP), Integrated Services Digital Network (ISDN), H.323, video protocols, IM protocols, multi-media protocols, Web Real-Time Protocol (WebRTC), and/or the like. Thus, the network 110 is an electronic communication network configured to carry messages via packets and/or circuit switched communications.

The communication manager 120 can be or may include hardware coupled with software that can route and manage communication sessions, such as a Private Branch Exchange (PBX), a router, a session manager, a central office switch, a proxy, a proxy server, and/or the like. The communication manager 120 further comprises a microprocessor 121, a network interface 122, a bandwidth manager 123, and a communication controller 124.

The microprocessor 121 can be or may include any hardware microprocessor 121 that can process and execute instructions in a computer readable medium, such as a memory or disk. The microprocessor 121 may be an Application Specific (ASIC) processor, a microcontroller, a Digital Signal Processor (DSP), and/or the like.

The network interface 122 can be or may include any hardware that allows the communication manager 120 to communicate on the network 110, such as an Ethernet interface, a WiFi interface, a fiber optic interface, a wired interface, and/or the like. The network interface 122 may comprise a plurality of network interfaces 122.

The bandwidth manager 123 can be any hardware/software that can determine and manage bandwidth on the network 110 and/or in the communication manager 120. The bandwidth manager 123 can manage bandwidth for different types of communications, such as voice, video, multimedia, IM, text, email, and/or the like. The bandwidth manager 123 can manage communications on multiple networks 110 and/or communication links. The bandwidth manager 123 can calculate bandwidth in various ways, such as per media session, for the entire communication session, and/or the like.

The communication controller 124 can be any hardware/software that can control how communications are processed and/or routed in the network 110. The communication controller 124 can manage how communication sessions are connected, forked, transferred, and/or the like. For example, the communication controller 124 can determine that a voice call from the communication endpoint 101A (from user A) is to be forked to the communication endpoints 101B-101N (the forked communication endpoints 101) based on an address of record for user B (where the address of record for user B identifies the communication endpoints 101B-101N). The forking may be parallel forking (just described) or serial forking. Serial forking is where the call is forked to a first communication endpoint 101 and then forked to a next communication endpoint 101 if unanswered after a period of time.

Figure 2:
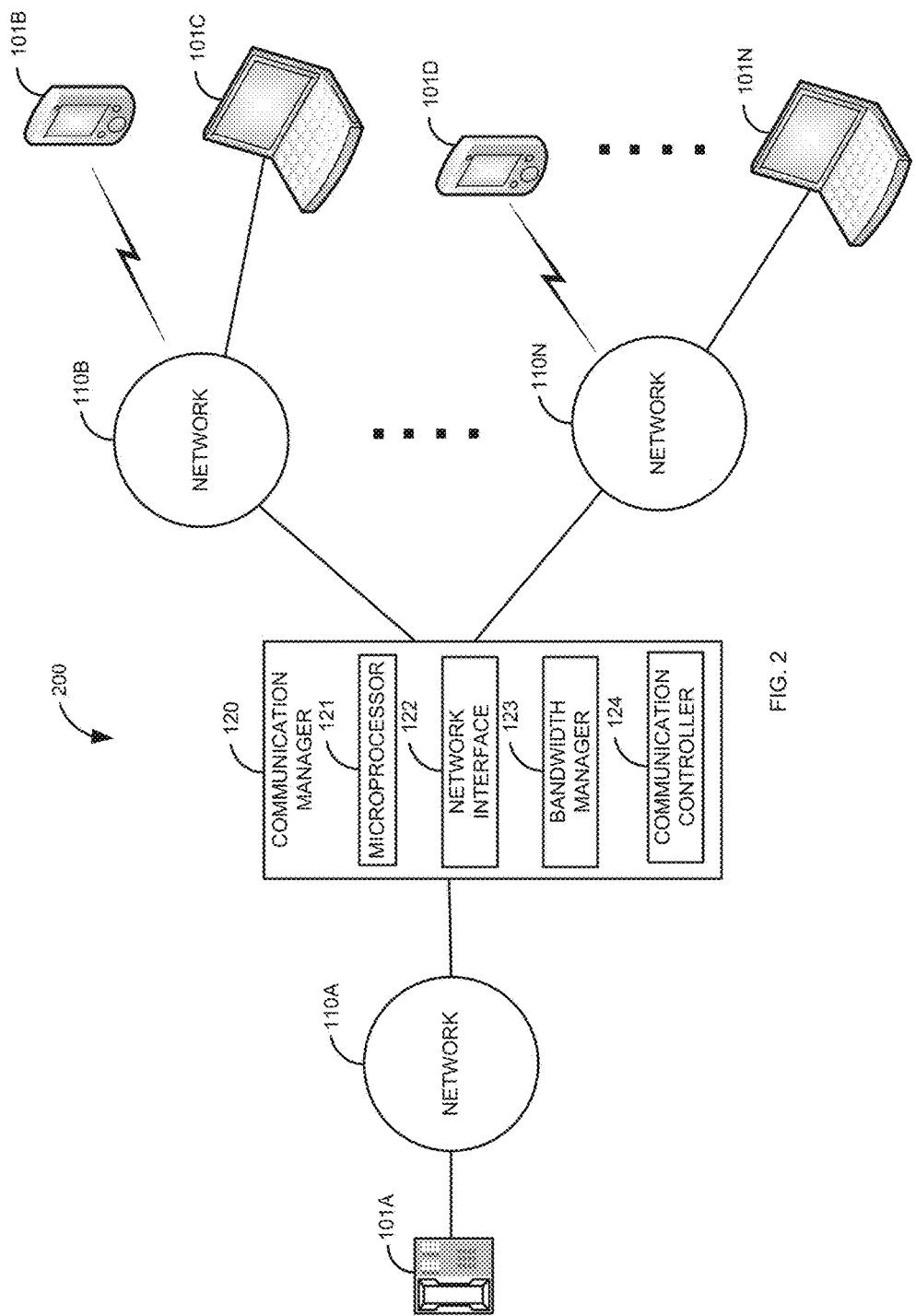
FIG. 2 is a block diagram of a second illustrative system for efficient allocation of bandwidth for forked communication sessions over multiple communication links.

FIG. 2 is a block diagram of a second illustrative system 200 for efficient allocation of bandwidth for forked communication sessions over multiple communication links. The second illustrative system 200 comprises the communication endpoints 101A-101N, networks 110A-110N, and the communication manager 120. FIG. 2 illustrates a communication manager 120 that can manage a forked communication session with a plurality of communication links. For example, a video call may be forked from the communication endpoint 101A to the communication endpoints 101B-101N. In this example, there is a different communication link for the forked communication session to the forked communication endpoints 101B-101C (via the network 110B) versus the communication link for the forked communications to the communication endpoints 101D-101N (via the network 110N). A communication link may be a computer network 110, a physical link, a virtual link, a satellite link, an optical link, a wireless link, and/or any communication link that has a limited amount of bandwidth.

Although the communication endpoints 101A-101N does not show the codecs 102A-102N for simplicity, the communication endpoints 101A-101N also comprise the codecs 102A-102N.

Figure 3:
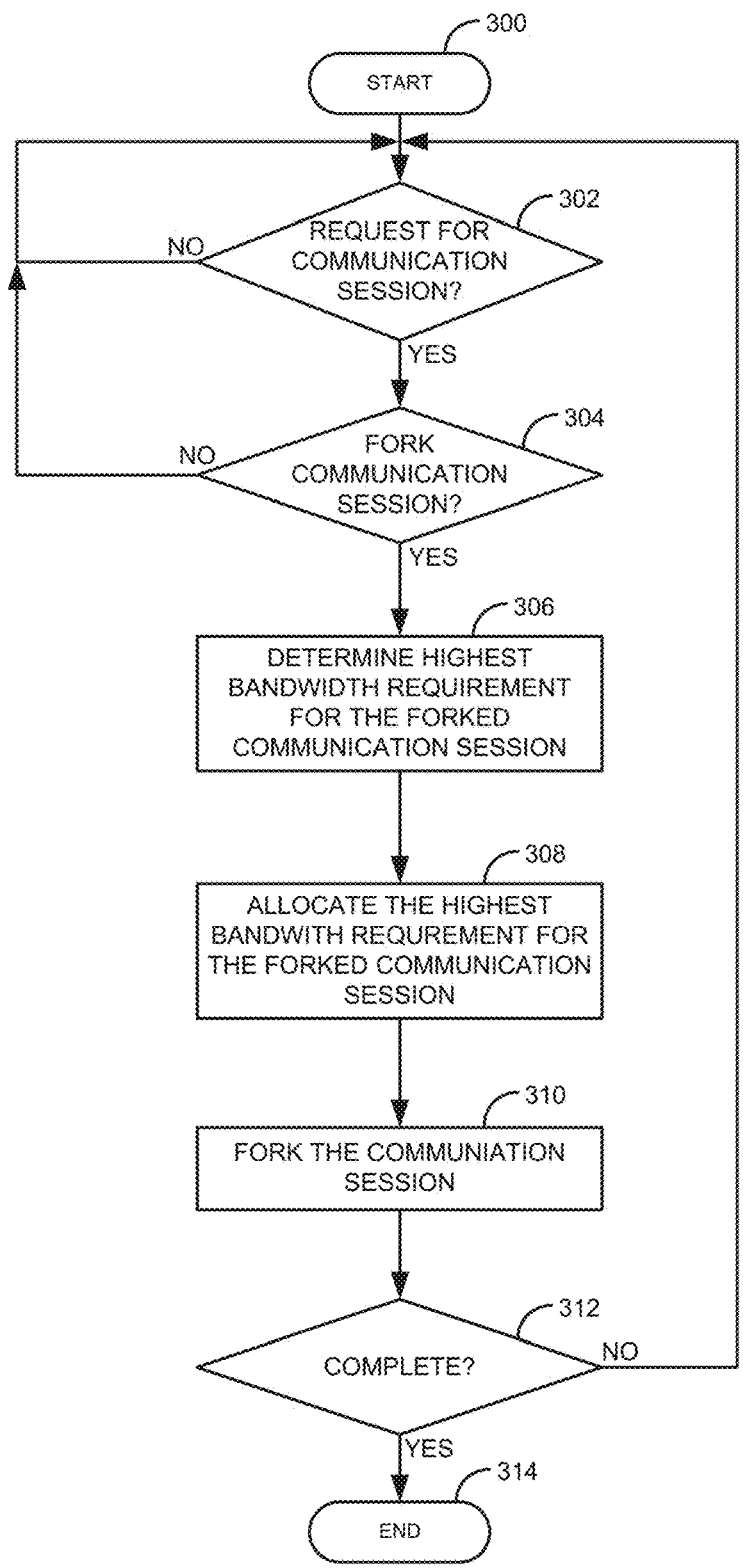
FIG. 3 is a flow diagram of a process for efficient allocation of bandwidth for forked communication sessions.
Figure 4:
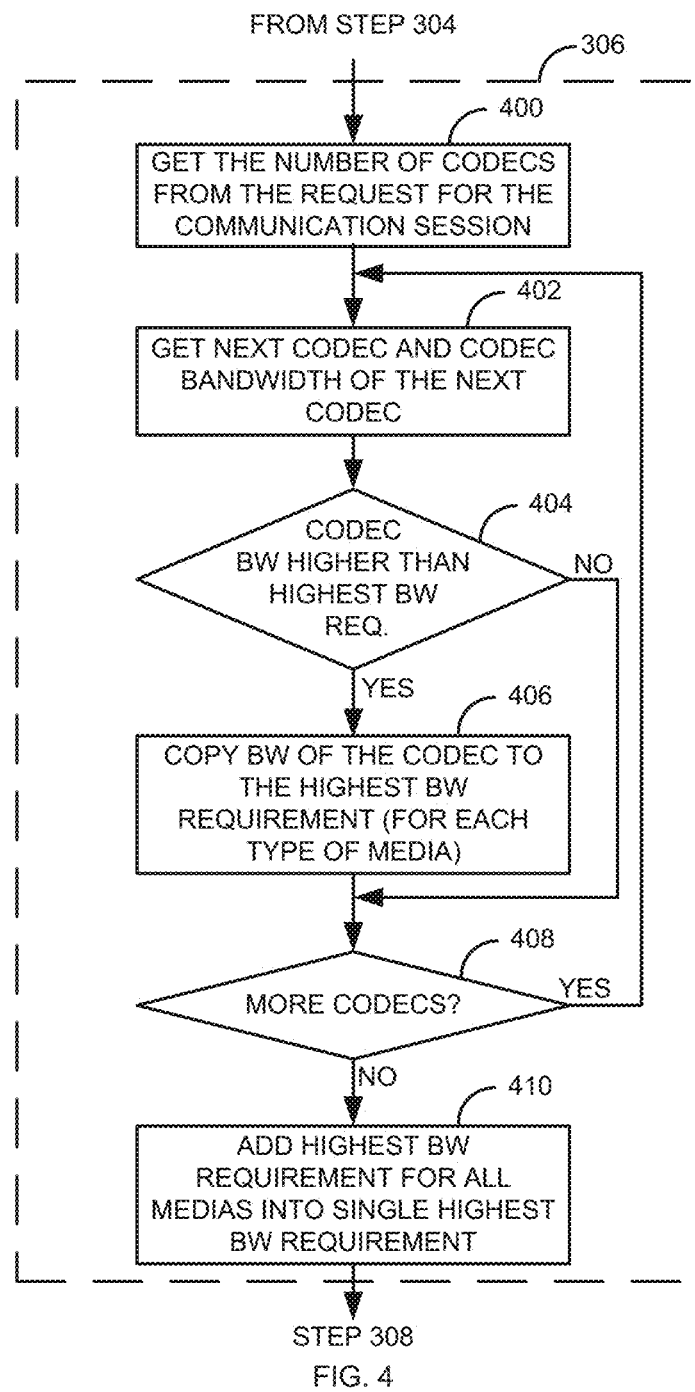
FIG. 4 is a flow diagram of a process for determining a highest bandwidth requirement for a forked communication session.
Figure 5:
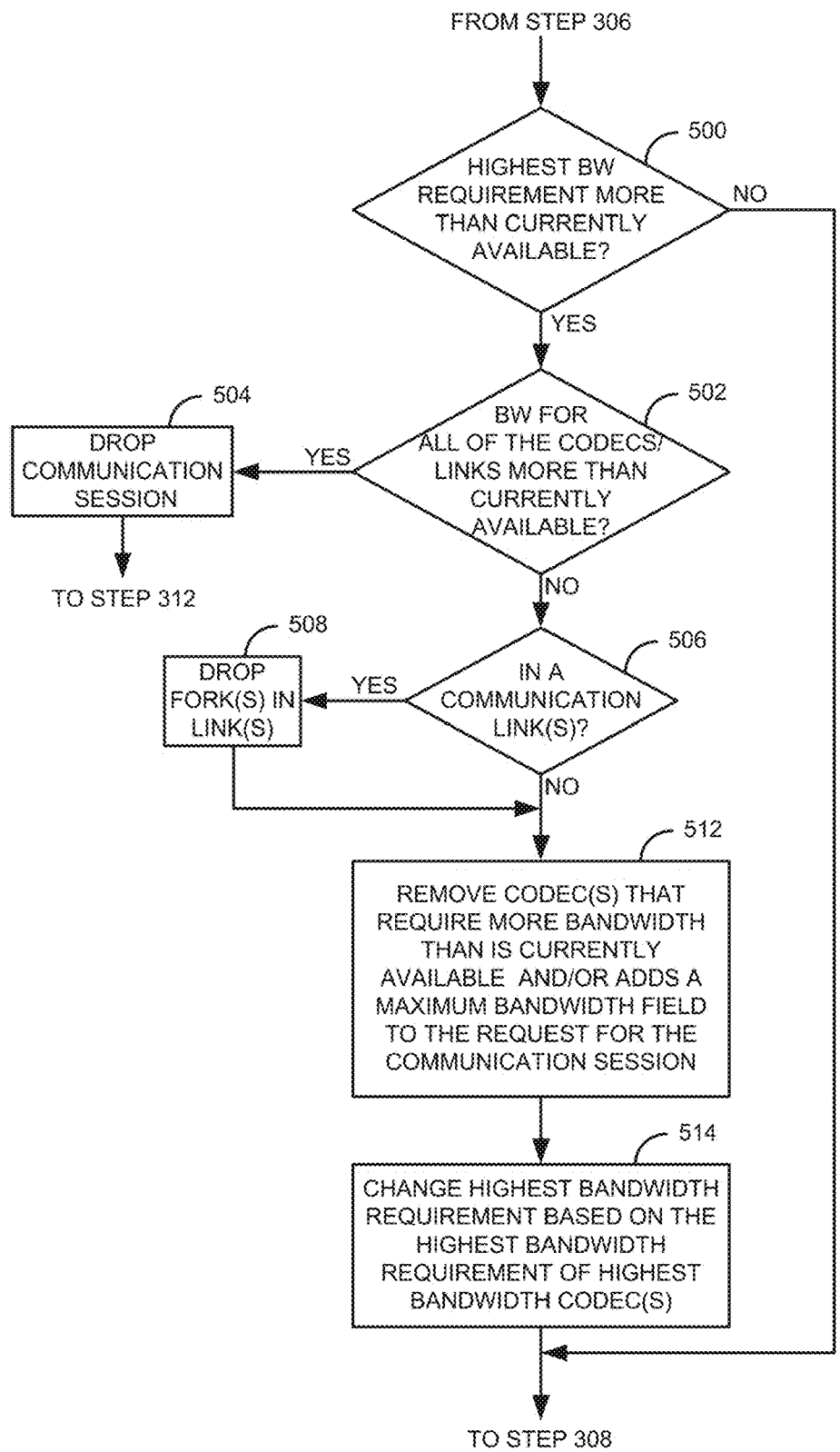
FIG. 5 is a flow diagram of a process for changing a highest bandwidth requirement based on an available bandwidth.

FIG. 3 is a flow diagram of a process for efficient allocation of bandwidth for forked communication sessions. Illustratively, the communication endpoints 101A-101N, the networks 110A-110N, the communication manager 120, the network interface 122, the bandwidth manager 123, and the communication controller 124 are stored-program-controlled entities, such as a computer or microprocessor 121, which performs the method of FIGS. 3-5 and the processes described herein by executing program instructions stored in a computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The processes of FIGS. 3-5 are generally described using SIP and SDP. However, the descriptions herein are not limited to SIP and SDP. Other protocols, such as H.323, WebRTC, video protocols, IM protocols, and/or the like may be used. For example, SDP may be used with WebRTC or H.323 may be used with a different codec negotiation protocol.

The process starts in step 300. The communication controller 124 waits, in step 302, to receive a request for a communication session. The request for the communication session typically has a unique Caller Identifier (CID) that is used to track the request for the communication as the request for the communication is forked to the forked communication endpoints 101B-101N. The request for a communication session may be for different types of communication sessions, such as a voice call, a video call, an Instant Messaging (IM) session, a multimedia communication session, and/or the like. The request for the communication session may use different protocols, such as SIP, SDP, H.323, video protocols, IM, and/or the like. For example, the request for a communication session may be a SIP INVITE message. If a request for a communication session is not received in step 302, the process repeats step 302 until a request for a communication session is received.

If a request for a communication session is received in step 302, the communication controller 124 determines if the communication session is to be forked in step 304. A communication session is forked when the request for the communication session is sent to two or more communication endpoints 101. A communication session may be forked for various reasons. For example, a communication session may be forked if the called party has an address of record that has multiple associated communication endpoints 101. The communication session may be forked based on user or administered preferences of the calling party and/or the called party. For example, the user Joe may have set user preferences that a call from Sally is also forked to Joe's secretary. Fred, Joe's supervisor, may have set a user preference that when Fred calls Joe that the call is forked to Joe's desktop phone and Joe's cell phone.

The call forking may be based on a serial call forking. Serial call forking is where the communication session is routed to a first communication endpoint 101 and then routed to one or more additional communication endpoints 101 based on the call not being answered within a time period. Serial forking can occur when the communication endpoint 101 becomes unreachable for some reason. For example, a user may put the communication endpoint 101 into a "do not disturb" state.

The CID is used to track each of the forks. For forked calls, a single CID is used along with a different dialog identifier for each of the forks. When a call is forked, each fork will have a different SIP To: tag. In FIG. 1, the CID for each fork can be assigned an identifier for each fork. For example, for a communication session from the communication endpoint 101A that is forked to the communication endpoints 101B-101N (the forked communication endpoints 101B-101N) may be identified by the CID/C1 for the fork to the communication endpoint 101B and CID/C2 for the fork to the communication endpoint 101N. This process can also apply to the communication links described in FIG. 2. The CID is a unique identifier used by the communication controller 124/communication manager 120 to distinguish different communication sessions.

If the communication session is not to be forked in step 304, the process handles the communication session in regular fashion (i.e., allocates bandwidth in normal fashion) and goes to step 302 to wait for a request for another communication session. If the communication session is to be forked in step 304, CID/C1 is created and all forks of the communication session are assigned to C1. In SIP, each fork of the communication session will have the same CID, but a different To: tag. The bandwidth manager 123 determines a highest bandwidth requirement for the forked communication session in step 306. The highest bandwidth requirement for the forked communication session is a highest bandwidth requirement of one or more codecs 102 in the request for the communication session.

For example, referring to FIG. 1, the communication endpoint 101A sends a SIP INVITE message for a voice call that will be forked to the communication endpoints 101B-101N. The SIP INVITE message has a Session Description Protocol (SDP) offer. The SDP offer is described in Network Working Group RFC 4566 entitled "SDP: Session Description Protocol," July 2006, which is incorporated herein in its entirety by reference. The SDP offer in the SIP INVITE message from the communication endpoint 101A identifies two voice codecs 102 supported by the communication endpoint 101A: 1) a codec 102 that requires 50 Kbps of bandwidth and 2) a codec 102 that requires 8 Kbps of bandwidth. The bandwidth manager 123 determines that the codec 102 that requires 50 Kbps has the highest bandwidth requirement that can be used for each of the forks (to communication endpoints 101B and 101N) in step 306. This is because, in SDP, the forked communication endpoints 101B-101N can select either of the two codecs (i.e., depending on the codecs supported in the communication endpoints 101B-101N).

The bandwidth manager 123 allocates the highest bandwidth requirement (50 Kbps in this example) for the forked communication session in step 308. Previously, the system would have allocated 150 Kbps for the network 110 (e.g., a location or link). The 150 Kbps is 50 Kbps times the number of forked communication endpoints 101 (assuming three communication endpoints 101)). However, in step 308 only 50 Kbps are allocated because once one of the forks of the communication session is answered, the other forks will be terminated and the allocation of the additional 100 Kbps is unnecessary. The communication session is then forked to the communication endpoints 101B-101N in step 310.

At some point, one of the forks of the communication session is answered (e.g., by a user at the communication endpoint 101B resulting in the fork to the communication session to the communication endpoint 101N being dropped). When one of the forks of the communication session has been answered, the answering communication endpoint 101B will send a response (e.g., a SIP 200 OK message with a SDP answer that selects one of the two codecs 102 from the SDP offer in the SIP INVITE) that leads to the establishment of a communication session between the communication endpoint 101A and the communication endpoint 101B (e.g., a Real-Time Protocol (RTP) stream).

The process determines, in step 312, if the process is complete. If the process is complete in step 312, the process ends in step 314. Otherwise, if the process is not complete in step 312, the process goes to step 302 to wait for a request for a communication session.

FIG. 4 is a flow diagram of a process for determining a highest bandwidth requirement for a forked communication session. The process of FIG. 4 is an exemplary embodiment of step 306 of FIG. 3.

After determining that the communication session is to be forked in step 304, the bandwidth manager 123 determines, in step 400, a number of codecs 102 from the request for the communication session. For example, the request for the communication session may be a SIP INVITE message for a video communication session from the communication endpoint 101A with a SDP offer that includes two video codecs 102 (400 Kbps and 800 Kbps) and two audio codecs 102 (8 Kbps and 16 Kbps) supported by the communication endpoint 101A.

The bandwidth manager 123 gets the next codec 102 (or the first codec 102 if it is the first time) in step 402. The bandwidth manager 123 also determines a codec bandwidth of step 402. The bandwidth manager 123 compares the bandwidth of the codec from step 402 to a highest bandwidth requirement for the forked communication session (e.g., a zero value if the first time) in step 404. If the codec bandwidth is not higher than the highest bandwidth requirement for a forked communication session in step 404, the process goes to step 408. Otherwise, if the codec bandwidth is higher in step 404, the bandwidth manager 123 copies the codec bandwidth to the highest bandwidth requirement for the forked communication session in step 406. In step 406, the copying the codec bandwidth is based on the media type. For example, if the codec 102 is a video codec 102, the highest bandwidth requirement for the forked communication session will be for the video codec(s) 102 versus a separate highest bandwidth requirement for a forked communication session for the audio codec(s) 102.

The bandwidth manager 123 determines if there are any more remaining codecs 102 in step 408. If there are remaining codecs 102 in step 408, the process goes to step 402. Otherwise, the bandwidth manager 123 adds the highest bandwidth requirements from all medias (e.g., voice and video) into a single highest bandwidth requirement and the process goes to step 308 where the single highest bandwidth requirement is allocated.

To illustrate, consider the above example of where request for the communication session has the SDP offer that includes the two video codecs 102 (400 Kbps and 800 Kbps) and the two audio codecs 102 (8 Kbps and 16 Kbps) supported by the communication endpoint 101A. The bandwidth manager 123, in step 400, determines that there are four codecs 102 in step 400 in the SDP offer. The bandwidth manager 123 gets the 400 Kbps video codec 102 in step 402. The bandwidth manager 123 compares the codec bandwidth (400 Kbps) to the highest bandwidth (for the video codecs 102) in step 404, which is zero because it is the first time. The bandwidth manager 123 copies the codec bandwidth (400 Kbps) to the highest bandwidth requirement for the forked communication session (for video codecs 102) in step 406. The bandwidth manager 123 determines that there are more codecs 102 in step 408 and gets the next codec 102 and its bandwidth (800 Kbps) in step 402. The bandwidth manager 123 compares the codec bandwidth (800 Kbps) to the highest bandwidth requirement for the forked communication session (400 Kbps for video codecs 102) in step 404. The bandwidth manager 123 copies the codec bandwidth (800 Kbps) into the highest bandwidth requirement for the forked communication session (for video codecs 102) in step 406. The bandwidth manager 123 determines in step 408 that are more codecs 102 in step 408.

The bandwidth manager 123 gets the next codec 102 and the bandwidth of the next codec 102 (the audio codec 102 with a 16 Kbps bandwidth) in step 402. The bandwidth manager 123 compares, in step 404, the codec bandwidth (16 Kbps) to the highest bandwidth requirement for the forked communication session (for audio codecs 102), which is zero since this is the first audio codec 102. The bandwidth manager 123 copies the codec bandwidth (16 Kbps) to the highest bandwidth requirement for the forked communication session (for audio codecs 102) in step 406. The bandwidth manager 123 determines that there is still one more codec 102 in step 408. The bandwidth manager 123 gets the next codec 102 and the next codec's bandwidth (8 Kbps) in step 402. The bandwidth manager 123 compares, in step 404, the codec bandwidth (8 Kbps) to the highest bandwidth requirement for the forked communication session for audio codecs 102 (16 Kbps). Since the bandwidth of the codec 102 (8 Kbps) is not higher than the highest bandwidth requirement for a forked communication session for audio codecs 102 (16 Kbps), the process goes to step 408.

The bandwidth manager 123 determines that there are no more codecs 102 in step 408. The bandwidth manager 123 adds the highest bandwidth requirements for the all the medias into a single highest bandwidth requirement in step 410 (800 Kbps+16 Kbps=816 Kbps). The process then goes to step 308 where the bandwidth manager 123 allocates the highest bandwidth requirement for the forked communication session (816 Kbps).

A similar process of FIG. 4 and step 308 may be used for each network 110/location/link. The bandwidth requirements for each fork on a network 110/location/link can be down throttled, by the bandwidth manager 123, based on different codec settings stored for a network 110/location/link. The bandwidth requirement for a specific network 110/location/link may be less than the highest bandwidth determined in step 410. The bandwidth requirement of each of the networks 110/location/links will be checked to select a highest bandwidth requirement for each fork using that network 110/location/link. For example, if the highest bandwidth requirement of step 410 is 1 Mbps and the bandwidth requirement for a fork on network 110A is 716 Kbps and the highest bandwidth requirement for the next fork on network 110A is 916 Kbps, the bandwidth manager would identify the highest bandwidth requirement to be 916 Kbps for the network 110A. If the next fork on the network 110A has the same or a lower value, no further allocation of bandwidth would be necessary. The highest bandwidth requirement for a network 110 would be allocated instead in the past where the maximum bandwidth times the number of forks on the network 110A were allocated.

FIG. 5 is a flow diagram of a process for changing a highest bandwidth requirement based on an available bandwidth. The process of FIG. 5 is an exemplary embodiment goes between steps 306 and 308 of FIG. 3.

The bandwidth manager 123 is responsible for determining if there is enough bandwidth on the network(s) 110/ communication links to establish a communication session. For example, if a request to establish a communication session is received and the network 110 is fully loaded, there will not be enough bandwidth available to establish the communication session. When the request to establish a communication session is received, the bandwidth manager 123 allocates bandwidth from the network 110 and/or communication links in order to accommodate the communication session. When the communication session ends, the bandwidth manager 123 deallocates the bandwidth. This way, the communication manager 120 can track network 110/communication link usage to determine a load level on the network(s) 110/communication link(s).

After determining the highest bandwidth requirement for the forked communication session in step 306, the bandwidth manager 123 determines, in step 500, if the highest bandwidth requirement for the forked communication session is more than what is currently available. For example, assume that request to establish the communication session has the SDP offer that includes the two video codecs 102 (400 Kbps and 800 Kbps) and the two audio codecs 102 (8 Kbps and 16 Kbps) that produce a highest bandwidth requirement of 816 Kbps and the currently available bandwidth (e.g., system/network bandwidth) is 900 Kbps. In this case, the highest bandwidth requirement of 816 Kbps less than 900 Kbps, so the process would go to step 308 to allocate the bandwidth of 816 Kbps.

Otherwise, if the highest bandwidth requirement for the forked communication session is more than currently available in step 500, the bandwidth manager 123 determines, in step 502, if the bandwidth for all of the codecs 102/links (i.e., the codecs 102 from step 400) is more than what is currently available. For example, take the above example of four codecs 102 (800 Kbps, 400 Kbps, 16 Kbps, and 8 Kbps) except that the currently available bandwidth is 4 Kbps. Since the bandwidth for each of the codecs 102 (800 Kbps, 400 Kbps, 16 Kbps, and 8 Kbps) is more than what is currently available (4 Kbps), the communication controller 124 drops the communication session in step 504 and the process goes to step 312 of FIG. 3 because there is currently not enough available bandwidth for any forks of the communication session.

Otherwise, if the bandwidth for all the codecs 102 is not more than currently available, the bandwidth manager 123 determines if the bandwidth for all the codecs 102 is more than currently available for any communication links for the forked communication session. For example, assume that the forked communication session is a voice call from the communication endpoint 101A that is to be forked to the communication endpoints 101B-101N as shown in FIG. 2. Assume that the there is only a single codec 102 that has a bandwidth of 16 Kbps in the request for the communication session. The currently available bandwidth for the network 110B is 500 Kbps and the current available bandwidth for the network 110N is 10 Kbps. In this example, the bandwidth manager 123 would determine in step 506 that for the communication link (network 110N) the bandwidth for all the codecs 102 (only one codec 102 with a bandwidth of 16 Kbps) in the communication link for the network 110N is more than what is currently available (10 Kbps). The communication controller 124 would drop the forks to the communication endpoints 101D-101N in the communication link (network 110N) in step 508 and the process would go to step 512.

The communication controller 124 removes, in step 512, the codec(s) 102 that require more bandwidth than is currently available and/or adds a maximum bandwidth field to the request for the communication session that is sent to the forked communication endpoints 101B-101N. For example, take the above example of four codecs 102 (800 Kbps, 400 Kbps, 16 Kbps, and 8 Kbps) except that the currently available bandwidth is 410 Kbps. In this example, the communication controller 124 would remove the 800 Kbps video codec 102 and the 16 Kbps audio codec 102 from the request for the communication session (e.g., a SIP INVIE) that is sent to the forked communication endpoints 101B-101N.

If the available bandwidth was 200 Kbps, the communication controller 124 would remove both the video codecs 102. This would result in changing the request for a video communication session (e.g., a SIP INVITE) to a request for an audio communication session with two audio codecs 102 (16 Kbps and 8 Kbps) that is sent to the forked communication endpoints 101B-101N.

The removing of the codec(s) 102 from the request for the communication session, in one embodiment, is implemented using SIP/SDP. For example, the request for the communication session can be a SIP INVITE message with a SDP offer (according to RFC 4566) with the four codecs 102 discussed above that is modified according to the available bandwidth.

Alternatively or in addition to removing the codecs 102, the communication controller 124 may add, in step 514, a maximum bandwidth field to the request for the communication session. For example, the request for the communication session can be a SIP INVITE message with a SDP offer. The communication controller 124 can set a b=line field (e.g., b=CT:100 for conference total=100 Kbps) as defined in RFC 4566, section 5.8. The b=line field sets a defined maximum bandwidth that can be used by the forked communication endpoints 101B-101N. When one of the forked communication endpoints 101 receives the request for the communication with the b=line field, the communication endpoint 101 can only select a codec(s) 102 (e.g., 1 codec 102 for video and 1 codec 102 for audio) that use a total bandwidth less that the b=line field.

The b=line field may be used for video communication sessions to limit a frame rate by a video codec 102. A video codec 102 may be able to use different bandwidths based on a defined frame rate. For example, a video codec 102 may be able use different bandwidths (e.g. 400 Kbps, 600 Kbps, and 800 Kbps) based on using different frame rates. If the available bandwidth was 700 Kbps, and the communication controller 124 did not remove the video codec 102 that supported the 400/600/800 Kbps bandwidths, and added a b=CT:700 field, this would inform the forked communication endpoint 101 that the codec 102 could only use a frame rate up to 600 Kbps.

The bandwidth manager 123 changes, in step 514, the highest bandwidth requirement based on the highest bandwidth requirement of the highest codecs 102. For example, take the above example of four codecs 102 (800 Kbps, 400 Kbps, 16 Kbps, and 8 Kbps) except that the currently available bandwidth is 410 Kbps. In this example, the bandwidth manager 123 would change the highest bandwidth requirement based on the highest bandwidth requirement (400 Kbps for the video codec 102 and 8 Kbps for the audio codec 102) to produce a highest bandwidth requirement of 408 Kbps (which was previously 816 Kbps). The process then goes to step 308 where the bandwidth manager 123 allocates the highest bandwidth requirement (408 Kbps) for the forked communication session.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

To avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various communication links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that program the microprocessor to:
receive a request to establish a communication session;
determine that the request to establish the communication session is to be forked to a plurality of communication endpoints;
in response to determining that the communication session is to be forked to the plurality of communication endpoints, determine a highest bandwidth requirement for the forked communication session, wherein the determined highest bandwidth requirement for the forked communication session is a highest bandwidth requirement of one or more codecs that are defined in the received request to establish the communication session; and
allocate the determined highest bandwidth requirement for the forked communication session.

2. The system of claim 1, wherein the determined highest bandwidth requirement for the forked communication session is more than a currently available bandwidth for a network, wherein the one or more codecs defined in the received request to establish the communication session comprises a plurality of codecs, and wherein the microprocessor removes one or more of the plurality of codecs from the received request to establish the communication session.

3. The system of claim 2, wherein the request to establish the communication session is a Session Initiation Protocol (SIP) INVITE message with a Session Description Protocol (SDP) offer, wherein the microprocessor removes the one or more of the plurality of codecs from the SDP offer.

4. The system of claim 1, wherein the determined highest bandwidth requirement for the forked communication session is more than a currently available bandwidth for a network, wherein the one or more codecs defined in the received request to establish the communication session comprises a plurality of codecs, and wherein the microprocessor adds a maximum bandwidth field to the received request to establish the communication session.

5. The system of claim 4, wherein the request to establish the communication session is a Session Initiation Protocol (SIP) INVITE message with a Session Description Protocol (SDP) offer and wherein the microprocessor adds the maximum bandwidth field in a SDP b=line field in the SDP offer.

6. The system of claim 5, wherein the forked communication session is a video communication session, wherein the SDP b=line field is used to limit a frame rate in the forked video communication session.

7. The system of claim 1, wherein the forked communication session is forked in a plurality of physical communication links and wherein the microprocessor:
identifies a highest bandwidth requirement for each of the plurality of physical communication links based on a highest bandwidth requirement for all the forks of the communication session in an individual physical communication link; and
allocates the highest bandwidth requirement for each of the individual physical communication links.

8. The system of claim 7, wherein a highest bandwidth requirement for one of the plurality of physical communication links is more than a currently available bandwidth for the one of the plurality of physical communication links, wherein the one or more codecs comprises a plurality of codecs, and wherein the microprocessor removes one or more of the plurality of codecs from the request to establish the communication session for all the forks of the communication in the one of the plurality of physical communication links.

9. The system of claim 7, wherein a highest bandwidth requirement for one of the plurality of physical communication links is more than a currently available bandwidth for the one of the plurality of physical communication links and wherein the microprocessor adds a maximum bandwidth field to the request to establish the communication session sent in the one of the plurality of physical communication links.

10. The system of claim 1, wherein determining the highest bandwidth requirement for the forked communication session causes the microprocessor to:
(i) get a codec from the request to establish the communication session;
(ii) determine a bandwidth for the codec;

(iii) compare the bandwidth of the codec to the highest bandwidth requirement;

(iv) copy the bandwidth of the codec to the highest bandwidth requirement if the bandwidth of the codec is higher; and repeat elements (i), (ii), (iii), and (iv) for the remaining codecs in the request to establish the communication session.

11. The system of claim 1, wherein the determined highest bandwidth requirement for the forked communication session is determined based on a plurality of codecs that support different medias.

12. The system of claim 1, wherein the microprocessor readable and executable instructions program the microprocessor to:

determine if a network or link has multiple forks;

in response to the network or link having multiple forks, determining if the highest bandwidth requirement for the forked communication session is more than a stored bandwidth requirement of the network or link; and in response to determining that the highest bandwidth requirement is more than the stored bandwidth requirement of the network or link, determining a highest bandwidth requirement for the network or link.

13. A method comprising:

receiving, by a microprocessor, a request to establish a communication session;

determining, by the microprocessor, that the request to establish the communication session is to be forked to a plurality of communication endpoints;

in response to determining that the communication session is to be forked to the plurality of communication endpoints, determining, by the microprocessor, a highest bandwidth requirement for the forked communication session, wherein the determined highest bandwidth requirement for the forked communication session is a highest bandwidth requirement of one or more codecs that are defined in the received request to establish the communication session; and allocating, by the microprocessor, the determined highest bandwidth requirement for the forked communication session.

14. The method of claim 13, wherein the determined highest bandwidth requirement for the forked communication session is more than a currently available bandwidth for a network, wherein the one or more codecs defined in the received request to establish the communication session comprises a plurality of codecs, and wherein the microprocessor removes one or more of the plurality of codecs from the received request to establish the communication session.

15. The method of claim 13, wherein the determined highest bandwidth requirement for the forked communication session is more than a currently available bandwidth for a network, wherein the one or more codecs defined in the received request to establish the communication session comprises a plurality of codecs, and wherein the microprocessor adds a maximum bandwidth field to the request to establish the communication session.

16. The method of claim 15, wherein the request to establish the communication session is a Session Initiation Protocol (SIP) INVITE message with a Session Description Protocol (SDP) offer, wherein the microprocessor adds the maximum bandwidth field in a SDP b=line field in the SDP offer.

17. The method of claim 16, wherein the forked communication session is a video communication session, wherein the SDP b=line field is used to limit a frame rate in the forked video communication session.

18. The method of claim 13, wherein the forked communication session is forked in a plurality of physical communication links and wherein the microprocessor:

identifies a highest bandwidth requirement for each of the plurality of physical communication links based on a highest bandwidth requirement for all the forks of the communication session in an individual physical communication link; and allocates the highest bandwidth requirement for each of the individual physical communication links.

19. The method of claim 18, wherein a highest bandwidth requirement for one of the plurality of physical communication links is more than a currently available bandwidth for the one of the plurality of physical communication links, wherein the one or more codecs comprises a plurality of codecs, and wherein the microprocessor removes one or more of the plurality of codecs from the request to establish the communication session for all the forks of the communication in the one of the plurality of physical communication links.

20. The method of claim 18, wherein a highest bandwidth requirement for one of the plurality of physical communication links is more than a currently available bandwidth for the one of the plurality of physical communication links and wherein the microprocessor adds a maximum bandwidth field to the request to establish the communication session sent in the one of the plurality of physical communication links.

* * * * *